Aug. 21, 1934.  D. W. ROSS ET AL  1,970,944

FURNACE WALL

Filed Dec. 19, 1931

INVENTORS
Donald W. Ross
& James M. Lambie,
By Archworth Martin,
Attorney.

Patented Aug. 21, 1934

1,970,944

UNITED STATES PATENT OFFICE 1,970,944

FURNACE WALL

Donald W. Ross and James M. Lambie, Washington, Pa.

Application December 19, 1931, Serial No. 582,006

5 Claims. (Cl. 49—54)

Our invention relates to an improvement in the construction of glass melting tanks, and more particularly to the vertical walls of such tanks.

Glass-melting tanks are usually formed of refractory blocks and the vertical walls thereof deteriorate and fall from two major causes—(1) penetration of the glass into the side wall blocks at the glass level, and (2) the dissolving upwardly of the bottom inner edges of the blocks.

The first-named reason for failure results largely from the hotter glass at the top of the bath, or the melted alkalies there present penetrating the blocks at the metal line or glass level, resulting in the forming of horizontally-extending recesses that render the blocks unfit for use. Unless the blocks are very dense and non-porous, this penetration or eating away of the block is quite pronounced within a short period of time.

At points below the glass level, the blocks become eaten away through solution action of the glass, with the result that the lower portions of the blocks become worn thin, occasionally causing wall failure. This is caused by the glass batch ingredients entering horizontal joints and forming slag which is heavier than molten glass. The slag being heavier than glass therefore flows downwardly away from the downwardly facing surfaces of the blocks. This causes rapid "upward eating" of the blocks.

We have discovered that if this slag can be prevented from flowing away from downwardly facing surfaces of the blocks, the attack of the block by the batch ingredients of the molten glass does not progress beyond a very small initial attack on the block, since the presence of the slag will protect the blocks from attack by the molten glass.

One object of our invention is to provide a glass tank structure whose blocks are so formed and positioned as to prevent deterioration or eating away thereof by the molten glass.

Another object of our invention is to provide a glass tank structure of generally improved form, possessing various advantages as hereinafter set forth.

Figure 1:
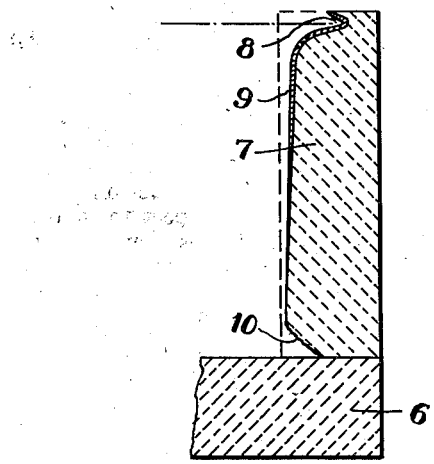
Figure 2:
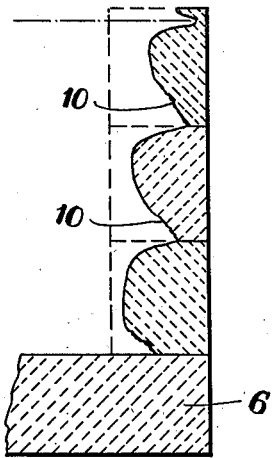
Figure 3:
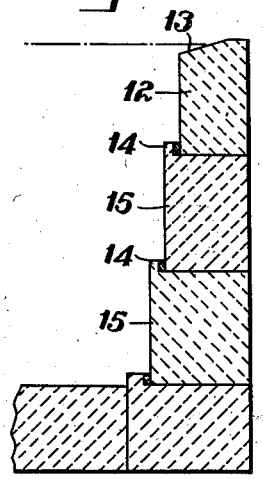
Figure 4:
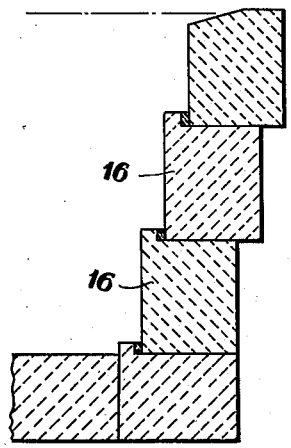

One form which our invention may take is shown in the accompanying drawing wherein Figures 1 and 2 are views illustrating the manner in which the ordinary forms of tank wall are attacked by the glass; Fig. 3 shows a tank wall of one form which embodies our invention, and Fig. 4 shows a modified form of wall.

Referring first to Fig. 1, 6 represents a portion of a bottom wall of a glass melting tank, and 7 a side wall thereof, both in section; the original form of the wall 7 being indicated by dash lines. The blocks 6 and 7 may consist of any variety of suitable tank block material. As heretofore stated, the molten glass at the metal line will ordinarily penetrate the block as indicated at 8.

The molten slag resulting from this penetration or solution by the molten glass will flow down the inner face of the block, forming a film 9 which serves to protect the face of the block. However, this does not increase the life of the wall, because the wearing away of the block at the glass level terminates its life. Portions of the slag thus formed at the metal line and fragments of blocks which it carries become commingled in the molten bath and cause "strings" or "stone" in the glass articles produced, which is of course objectionable.

As stated above, owing to the fact that the slag resulting from attack by the molten glass on the tank wall is heavier than glass, it tends to flow downwardly away from the block. The flowing away of this slag leaves downward facing portions of the blocks unprotected and such surfaces hence wear away rapidly, as at 10.

The solution of a tank block on the vertical surface of a block which is exposed to the glass is very slow except at the metal line, where certain of the alkalies which are very fluid at glass-melting temperatures penetrate the block. This difficulty may be overcome by slanting the block inwardly at the top so that only an upward facing surface 13 is in contact with the glass. The surface 13 extends from a plane below the normal glass-level to a plane above such level. Also, the blocks 12 which are at the glass level may be of great density. However, even dense blocks are eaten quite rapidly on downward facing surfaces.

In order to protect downward facing surfaces of dense blocks, as well as of blocks of other types, from the action of molten glass, we provide means for retaining the molten slag at the horizontal joints between blocks. This means consists of lips or ribs 14 at the upper inner edges of the lower blocks, the lower blocks 15 being successively of greater horizontal thickness than the upper blocks, or being set further into the tank than are the upper blocks, as in the case of the blocks 16 of Fig. 4.

The lips or ribs 14 catching the slag as they do, conduct it into both horizontal and vertical joints between blocks where it freezes, in which position it protects the blocks. The entrapping of this slag material also prevents it from mixing into the glass and forming "strings".

With this construction the lower blocks may be of less refractory material and less expensive than the blocks which are placed at the glass level. Thus by our method of construction, we are enabled to use blocks of different characters for different portions of the tanks, each block being best suited for that portion of the tank where it is to be used. For example, we may use a very refractory block for the top courses where the temperature is highest, and we may use a very dense block in the top courses where the penetration, due to porosity of the block, is greatest. It has heretofore been considered necessary to use large blocks in tank construction, without regard to the cost of making large blocks as compared with smaller ones, because of the attack on the smaller blocks at horizontal joints.

By our method of construction, we are enabled to use small and cheaply fabricated blocks because the great objection to the small blocks (upward eating at the horizontal joints) is overcome by our method of construction. We are further able to use very expensive blocks in the top course and very inexpensive blocks in the lower courses.

Luting material which is heavier than glass, such for example as that described in our Patent No. 1,727,675, issued September 10, 1925, may be employed to fill spaces or irregularities between each lip 14 and the block immediately above the same. This luting material will prevent or delay the initial attack on the inner lower corners of the blocks, and the glass will tend to flow into the horizontal joints instead of floating to the surface of the glass bath.

Whether the luting material is present or not, the lips will retain molten glass and protect the bottom inner edges of the blocks from further attack.

We claim as our invention:—

1. A glass tank side wall composed of refractory blocks in superposed relation, a lower block having a rib at its inner upper edge extending into the tank a greater distance than the adjacent portion of the upper block, and a luting material which is heavier than molten glass disposed behind the said rib at a height which will permit it to flow into the joint between the blocks.

2. A glass tank side wall composed of refractory blocks in superposed relation, a lower block having its inner face extending into the tank a greater distance than the inner face of the adjoining upper block, and having a rib at its inner upper edge positioned to collect reaction products of the blocks and the glass into the horizontal joint between the blocks.

3. A glass tank side wall composed of refractory blocks in superposed relation, a lower block whose inner face extends a greater distance into the tank than does that of the adjoining block above, and which has an upwardly extending rib at its inner edge, the rib serving to collect products of reaction of block with glass and conduct them into the horizontal joint between said blocks.

4. A glass tank side wall composed of refractory blocks in superposed relation, a lower block mainly beneath an upper block but having its inner upper edge extending into the tank a greater distance than the adjacent portion of the upper block, the lower block having a horizontal, upwardly exposed surface at the horizontal joint line.

5. A new article of manufacture, a glass tank side wall structure composed of refractory blocks in superposed relation, a lower block mainly beneath an upper block but having its inner side such that it will extend a greater distance into the tank than the adjacent portion of the upper block, the upwardly exposed surface of the lower block being of such shape, that reaction products which form on such blocks in use will be held at the horizontal joint between the lower and upper blocks.

DONALD W. ROSS.
JAMES M. LAMBIE.